US010753635B2

(12) United States Patent
Handte, III et al.

(10) Patent No.: US 10,753,635 B2
(45) Date of Patent: Aug. 25, 2020

(54) ADJUSTABLE THERMAL DISPERSION AIR FLOW RATE METER

(71) Applicant: Air Distribution Technologies IP, LLC, Milwaukee, WI (US)

(72) Inventors: Louis E. Handte, III, Howard, KS (US); Edward N. Koop, Grandview, MO (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 211 days.

(21) Appl. No.: 16/038,039

(22) Filed: Jul. 17, 2018

(65) Prior Publication Data

US 2019/0368765 A1  Dec. 5, 2019

Related U.S. Application Data

(60) Provisional application No. 62/678,899, filed on May 31, 2018.

(51) Int. Cl.
*F24F 11/74* (2018.01)
*F24F 1/0007* (2019.01)
*G01F 1/688* (2006.01)

(52) U.S. Cl.
CPC ............ *F24F 11/74* (2018.01); *F24F 1/0007* (2013.01); *G01F 1/688* (2013.01)

(58) Field of Classification Search
CPC ........... G01K 13/02; G01F 1/00; G01F 1/684; G01F 1/688; F24F 11/74; F24F 1/0007; F24F 2110/30
See application file for complete search history.

(56) References Cited

U.S. PATENT DOCUMENTS

| 5,426,975 A * | 6/1995 | Stark ........................ F04D 27/00 |
| 5,780,737 A * | 7/1998 | Wible ...................... G01F 1/684 |
| 2008/0198896 A1* | 8/2008 | Nair ................ H01L 2924/0002 |

FOREIGN PATENT DOCUMENTS

CN    110426093 A  * 11/2019

* cited by examiner

*Primary Examiner* — Francis C Gray
(74) *Attorney, Agent, or Firm* — Fletcher Yoder, P.C.

(57) ABSTRACT

An air flow rate meter includes a probe housing having a pass-through opening. The air flow rate meter also includes a sensing circuit coupled with the probe housing and positioned at least partially within the pass-through opening. The air flow rate meter also includes an arm coupled to the probe housing. The arm includes a probe-end on which the probe housing is disposed, a mounting-end opposite to the probe-end, and an angled segment extending at a first angle from the probe-end and at a second angle from the mounting-end.

25 Claims, 10 Drawing Sheets

ADJUSTABLE THERMAL DISPERSION AIR FLOW RATE METER

CROSS REFERENCE TO RELATED APPLICATIONS

This application claims priority from and the benefit of U.S. Provisional Application Ser. No. 62/678,899, entitled "ADJUSTABLE THERMAL DISPERSION MASS FLOW RATE METER," filed May 31, 2018, which is hereby incorporated by reference in its entirety for all purposes.

BACKGROUND

The present disclosure relates generally to an air flow rate meter, such as a thermal dispersion air flow rate meter, configured to detect an air flow rate of a fluid flow. The air flow rate meter may be utilized in, for example, a heating, ventilation, and air conditioning (HVAC) system.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between an evaporator coil where the fluid absorbs heat and a condenser where the fluid releases heat. The fluid flowing within the closed loop is generally formulated to undergo phase changes within the normal operating temperatures and pressures of the system, so that quantities of heat can be exchanged by virtue of the latent heat of vaporization of the fluid. A fan or fans may blow air over the coils of the heat exchanger(s) in order to condition the air.

Based on air flow demands, environmental conditions, system conditions, and other factors, it may be desirable to determine an air flow rate, temperature, and other characteristics of an air flow through the HVAC system. It is now recognized that traditional sensors and meters may lack versatility, and may be inaccurate, costly, and susceptible to thermal shock.

SUMMARY

The present disclosure relates to an air flow rate meter. The air flow rate meter includes a probe housing having a pass-through opening. The air flow rate meter also includes a sensing circuit coupled with the probe housing and positioned at least partially within the pass-through opening. The air flow rate meter also includes an arm coupled to the probe housing. The arm includes a probe-end on which the probe housing is disposed, a mounting-end opposite to the probe-end, and an angled segment extending at a first angle from the probe-end and at a second angle from the mounting-end.

The present disclosure also relates to a fan having a mounting wall, and an air flow rate meter. The air flow rate meter includes a hollow arm having a mounting-end adjustably coupled to the mounting wall of the fan, having a probe-end on which a probe housing of the air flow rate meter is disposed, and having an angled segment extending at a first angle from the mounting-end and at a second angle from the probe-end. The hollow arm is rotatable about a longitudinal mounting-end axis of the hollow arm, the probe housing is rotatable about a longitudinal probe-end axis of the hollow arm, or both.

The present disclosure also relates to a thermal dispersion air flow rate meter having a probe housing. The probe housing includes a micro-USB receptacle enclosed from a fluid flow over the probe housing. The thermal dispersion air flow rate meter also includes a micro-USB port disposed in the micro-USB receptacle. The thermal dispersion air flow rate meter also includes a flex circuit extending from the micro-USB port within the micro-USB receptacle and into a pass-through opening formed by the probe housing. The flex circuit includes an ambient reference element and an active heated element positioned on the flex circuit within the pass-through opening formed by the probe housing.

DRAWINGS

DETAILED DESCRIPTION

Figure 1:
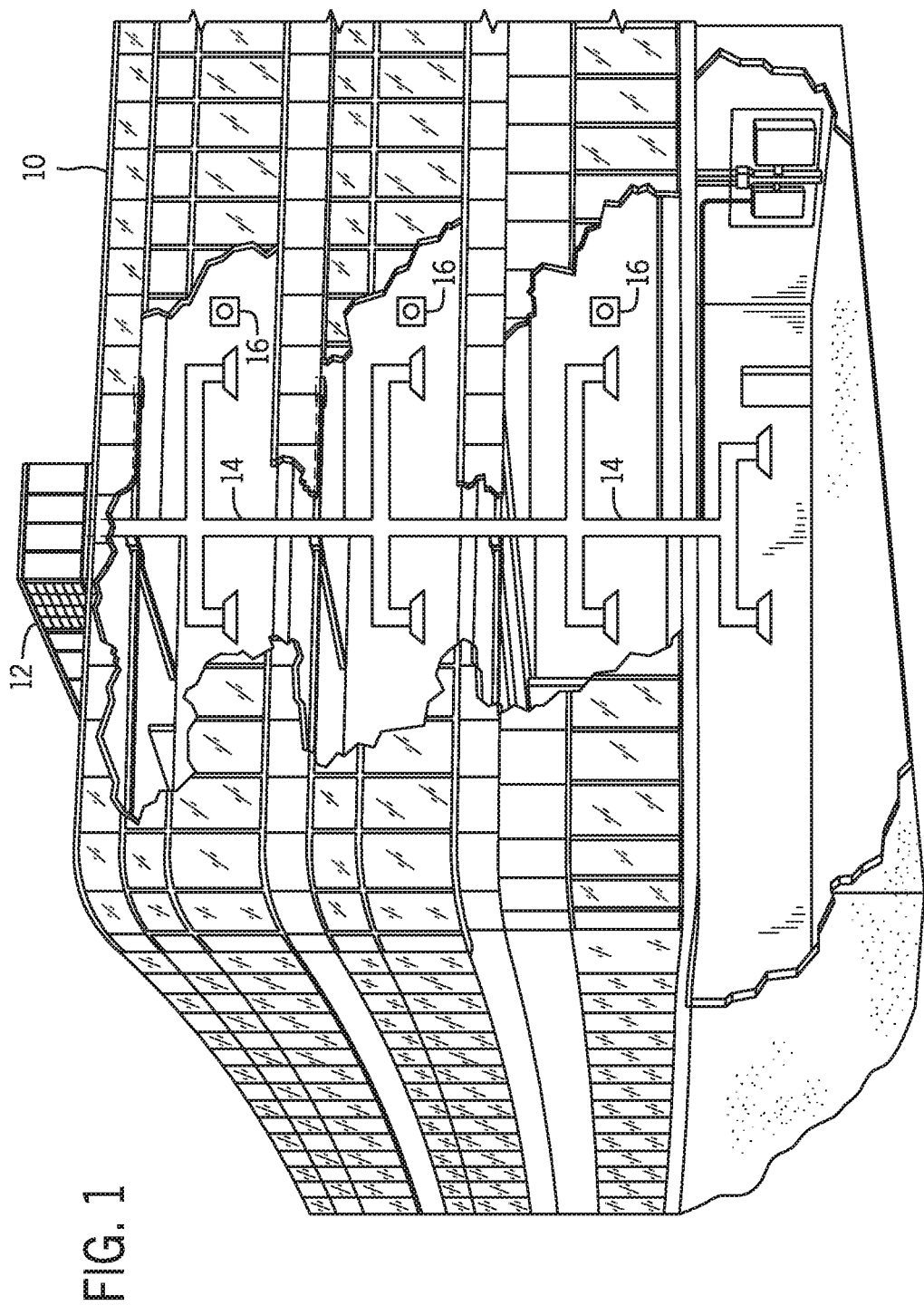
FIG. 1 is a perspective view a heating, ventilation, and air conditioning (HVAC) system for building environmental management, in accordance with embodiments described herein.

The present disclosure is directed toward an adjustable air flow rate meter, such as an adjustable thermal dispersion air flow rate meter, configured to detect an air flow rate of a fluid flow. The adjustable air flow rate meter may be utilized in, for example, a heating, ventilation, and air conditioning (HVAC) system.

A thermal dispersion air flow rate meter may include a probe having a reference element, referred to as an ambient, element, unheated element, or ambient unheated element, in addition to an active element, referred to as a heated element or active heated element, which is disposed adjacent to the unheated element. The unheated element may include a sensor which measures or detects a temperature in a fluid flow over the unheated element of the thermal dispersion air flow rate meter. Electrical wattage, or a "heating current," may be utilized to heat the active heated element. In one embodiment, referred to as a "constant current" thermal dispersion air flow rate meter, the heating current provided to the heated element may be constant, and a temperature differential between the ambient unheated element and active heated element may be measured. In other words, the temperature differential, which may change during operation of the thermal dispersion air flow rate meter, is the output from the sensing elements. Air flow rate is then determined as a function of the temperature differential between the active heated element and the ambient unheated element, or more particularly between the active heated element and the cooling effect of the air flow passing over the ambient unheated element. For example, the internal resistance of the sensing elements is deducible from the measured temperature differential and the constant heating current, power consumption is deducible from the internal resistance, and air flow rate is deducible from the power consumption.

In another embodiment, referred to herein as the "constant temperature differential" thermal dispersion air flow rate meter, the heating current supplied to the active heated element may be modulated in order to maintain a constant temperature differential between the active heated element and the unheated element. For example, as the fluid flow passes over the active heated element, molecules of the fluid may extract heat from the active heated element. Thus, the electrical wattage provided to the active heated element may be increased such that the temperature differential between the active heated element and the unheated element is maintained. The heating current, or change to the heating current, required to maintain the constant temperature differential between the active heated element and the unheated element is correlated with, or proportional to, the cooling effect caused by the molecules flowing by the probe of the thermal dispersion air flow rate meter. Thus, the air flow rate is deducible from the cooling effect caused by the molecules and, thus, from the heating current (or corresponding electrical power) provided to the heated element, by way of the correspondence/proportionality noted above.

In accordance with present embodiments, the thermal dispersion air flow rate meter includes a probe housing which forms a pass-through opening exposing the above-described active heated element and unheated element, which are encapsulated disposed in a polyamide film extending into the pass-through opening. The polyamide film, active heated element, unheated element, and electrical wiring associated with the active heated element and unheated element may form a "flex circuit." The flex circuit is a sensing circuit generally fixed within the pass-through opening, as described in detail with reference to the drawings. The pass-through opening also enables a fluid flow therethrough, and over the polyamide film, such that the fluid flow passes over the active heated element and unheated element of the flex circuit within the pass-through opening. Electrical wiring extends from the active heated element and the unheated element toward a micro-USB port, or some other communication/power port.

The probe housing may include a receptacle that receives an extension of the flex circuit. For example, the extension of the flex circuit may extend through a small opening in a wall of the probe housing to access the receptacle. The electrical wires extending from the active heated element and unheated element, and within the polyamide film of the flex circuit, terminate at a micro-USB port disposed in the receptacle, or some other communication/power port. The receptacle is configured to receive a micro-USB, or some other communication/power device, at the micro-USB or other communication/power port. A cable extending from the micro-USB may pass along a hollow arm of the thermal dispersion air flow rate meter, as described in detail below.

The thermal dispersion air flow rate meter includes an arm extending from the above-described probe housing. The arm may be a hollow conduit which enables an electrical cable to extend therethrough, for coupling to the micro-USB, which is coupled to the micro-USB port noted above. The arm may be coupled to the probe housing via a nut, such as a quarter-turn nut, or a nut assembly having the nut. The probe housing may be rotationally coupled to the arm of the thermal dispersion air flow rate sensor, via the nut or nut assembly, such that the probe housing can be turned circumferentially with respect to a longitudinal probe-end axis of a probe-end of the arm. Accordingly, the probe housing is adjustable to orient the pass-through opening such that a width of the flex circuit having the active heated element and the unheated element is parallel to the fluid flow through the pass-through opening.

The arm of the thermal dispersion air flow rate meter may include an angled cantilever extending into the fluid flow. For example, the arm may include a probe-end on which the above-described probe is attached, an angled segment extending at a first angle from the probe-end, and a mounting-end extending at a second angle from the angled segment. The mounting-end of the arm is mounted to a substrate surface, such as a wall of a fan housing, and the angled segment and probe-end may be cantilevered from the wall of the fan housing such that the probe-end, and corresponding probe housing, are disposed adjacent to an intake opening of the fan housing. The mounting-end may be mounted to the wall of the fan housing, for example, via two clamps extending over the mounting-end of the arm and tightened via two corresponding screws extending through the wall of the fan housing.

The screws and clamps noted above may be temporarily loosened to adjust a position of the thermal dispersion air flow rate meter. For example, due to the above-described cantilevering of the arm such that the angled segment and probe-end extend adjacent to the air intake opening of the fan housing, the thermal dispersion air flow rate meter may be rotated 360 degrees about a longitudinal mounting-end axis through the mounting-end of the arm. The rotation about the longitudinal mounting-end axis enables adjustment of a distance between the probe housing and a plane of the air intake opening through the fan wall mounting surface. The rotation about the longitudinal mounting-end axis also enables adjustment of a radial position of the probe housing with respect to a center of the air intake opening.

Further, the thermal dispersion air flow rate meter may be translated along the longitudinal mounting-end axis of the arm by sliding the mounting-end within the clamps, while the screws and corresponding clamps are temporarily loose. The translation enables adjustment of the radial position of the probe housing with respect to the center of the air intake opening. After adjustment, the screws and corresponding clamps may be tightened.

By facilitating the above-described adjustability of the thermal dispersion air flow rate meter, the probe housing and corresponding elements may be positioned and re-positioned for ideal detection of air flow rate and other characteristics of the fluid flow through the fan. Further, the use of the micro-USB, and corresponding structure of the thermal dispersion air flow rate meter, enables improved accuracy of the measurements, improved usability, and reduced power consumption, as compared to traditional embodiments which utilize welded or soldered connections between electrical components. For example, the micro-USB may substantially reduce non-uniform resistance otherwise present in welded or soldered connections. The sensing or flex circuit also reduces susceptibility to thermal shock over traditional thermistor embodiments utilizing glass-beaded sensing elements. These and other features will be described in detail below with reference to the drawings.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
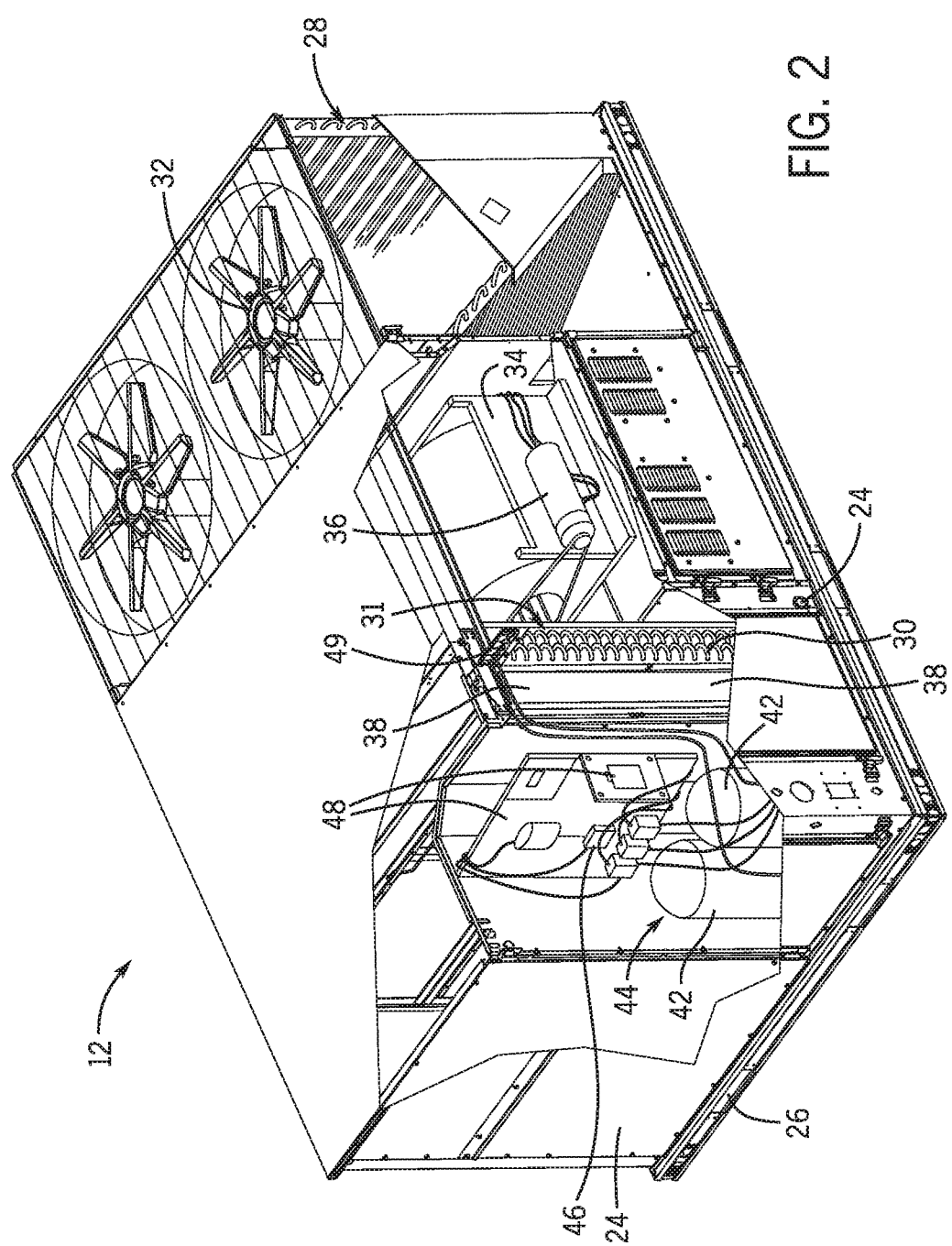
FIG. 2 is a perspective view of the packaged HVAC unit of the HVAC system of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel and/or microchannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
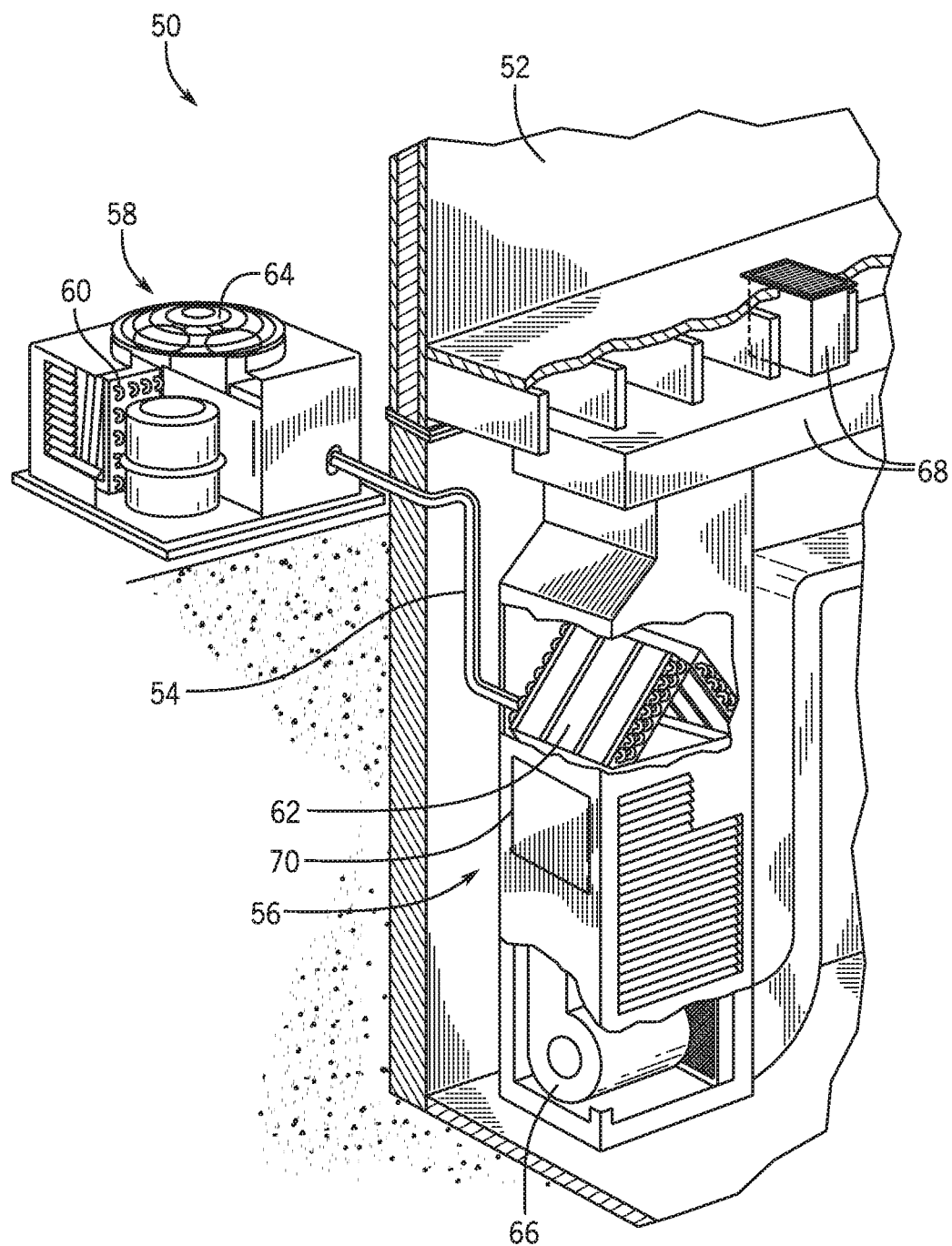
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
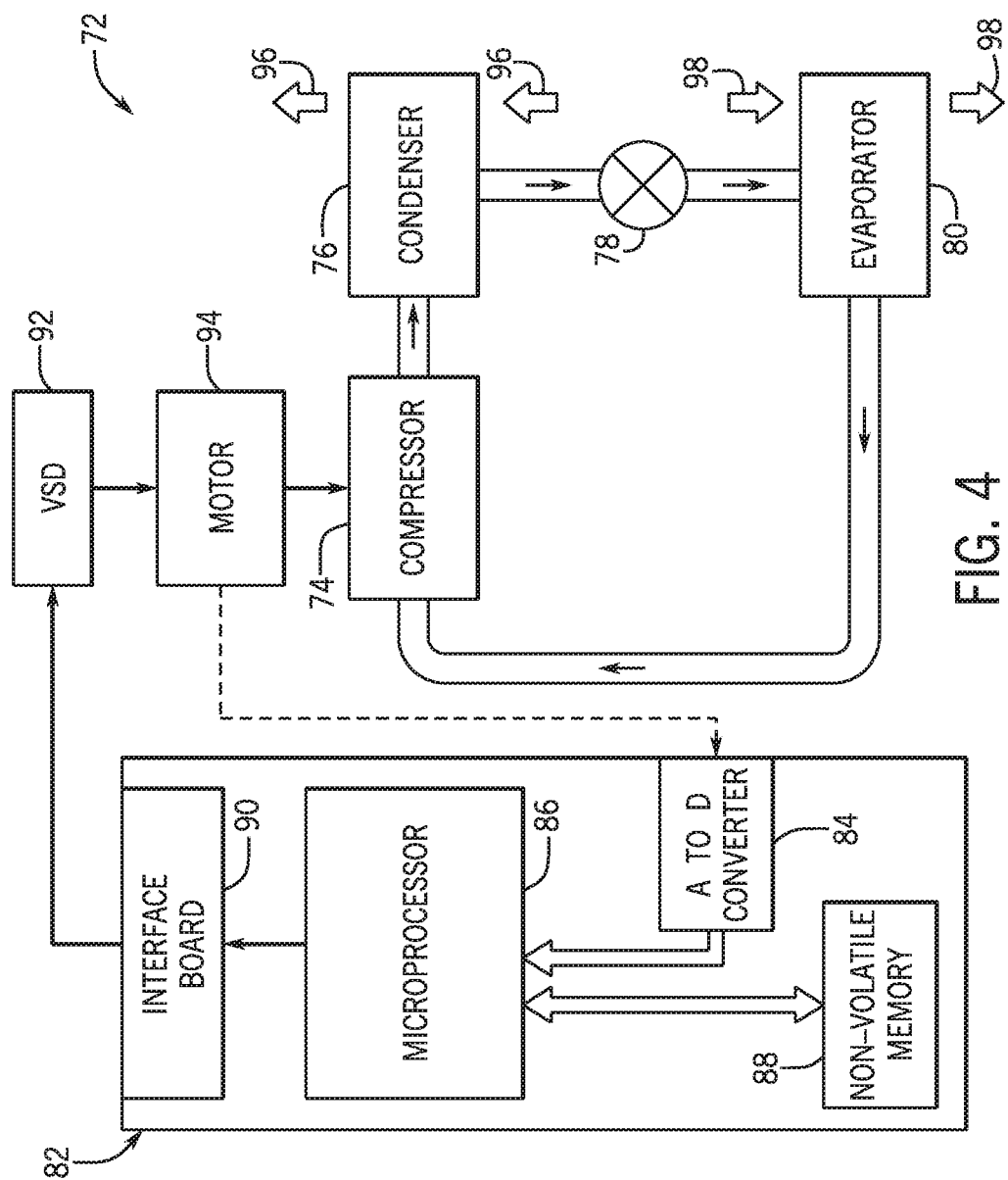
FIG. 4 is a schematic diagram of a vapor compression system that may be used in the packaged HVAC system of FIG. 2 and the residential HVAC system of FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications. Further, any of FIGS. 1-4 may include, in accordance with an aspect of the present disclosure, one or more adjustable thermal dispersion air flow rate meters configured to detect an air flow rate and other characteristics of a fluid flow through one or more fans. The adjustable thermal dispersion air flow rate meter may enable improved positioning of a probe of the adjustable thermal dispersion air flow rate meter, which may improve an accuracy or consistency of the sensor elements. Further, a micro-USB connection may be included in the adjustable thermal dispersion air flow rate meter, which may improve accuracy of the measurements, usability, power consumption compared to traditional embodiments having welded or soldered connections. These and other features will be described in detail below with reference to the drawings.

Figure 5:
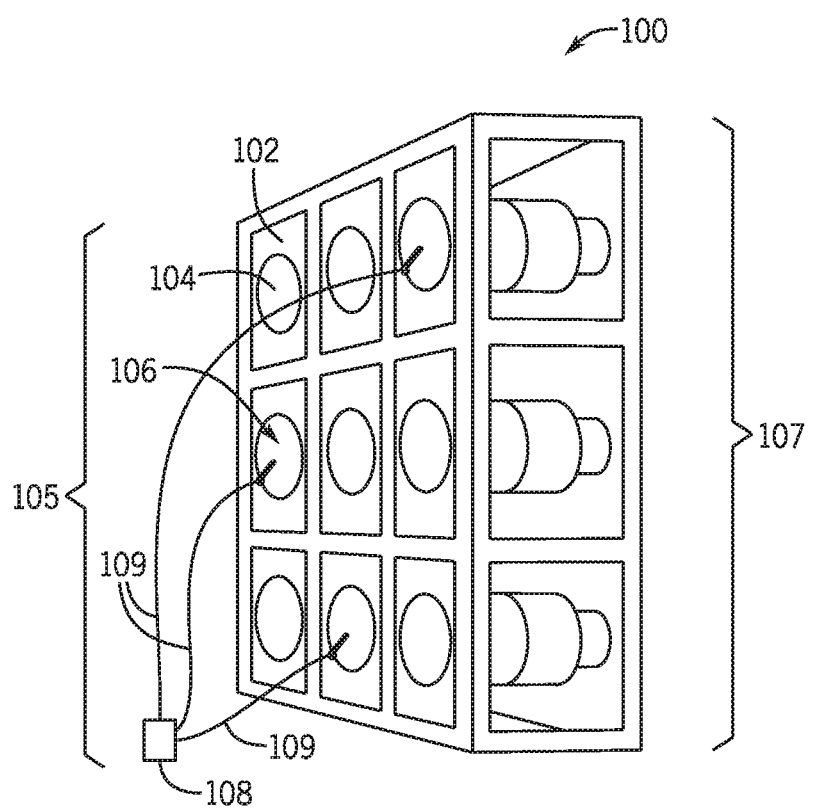
FIG. 5 is a perspective view of a fan grid assembly having twelve fans and an air flow detection assembly, in accordance with embodiments described herein.

FIG. 5 is a perspective view of an embodiment of a fan grid assembly 100 having nine fans 102, each with an air intake opening 104, and an air flow rate detection assembly 105. The nine fans 102 are arranged in three rows 107 of three fans 102 each. In other embodiments, a different number and arrangement of the fans 102 may be included, such as twelve of the fans 102.

The air flow rate detection assembly 105 in the illustrated embodiment includes three thermal dispersion air flow rate meters 106, one in each row 107 of the fans 102. The air flow rate meters 106 extend into, or adjacent to, the corresponding air intake openings 104. In other embodiments, more of the fans 102, such as each fan 102, may include at least one thermal dispersion air flow rate meter 106. The thermal dispersion air flow rate meters 106 may be coupled to a Central Processing Unit (CPU) 108 via, for example, electrical cables 109 extending from a micro-USB communicatively coupled to the sensing elements disposed in the corresponding thermal dispersion air flow rate meters 106. The CPU 108 may also include a power source. As noted above, and in accordance with present embodiments, each thermal dispersion air flow rate meter 106 may include features enabling adjustment of the position of the thermal dispersion air flow rate meter 106. Further, each thermal dispersion air flow rate meter may include a micro-USB connection to the sensing elements, such as via intervening electrical wires disposed in a polyamide film to form a "flex circuit" between the sensing elements and a micro-USB port, as opposed to welded or soldered connections. The flex circuit is a type of sensing circuit which utilizes a polyamide film to encapsulate the sensing elements and corresponding electrical wiring. The flex circuit may reduce or negate a susceptibility to thermal shock over traditional thermistor embodiments which utilize glass-beaded sensing elements. Further, the micro-USB connection may reduce or negate non-uniform resistance seen in traditional embodiments having welded or soldered connections.

Figure 6:
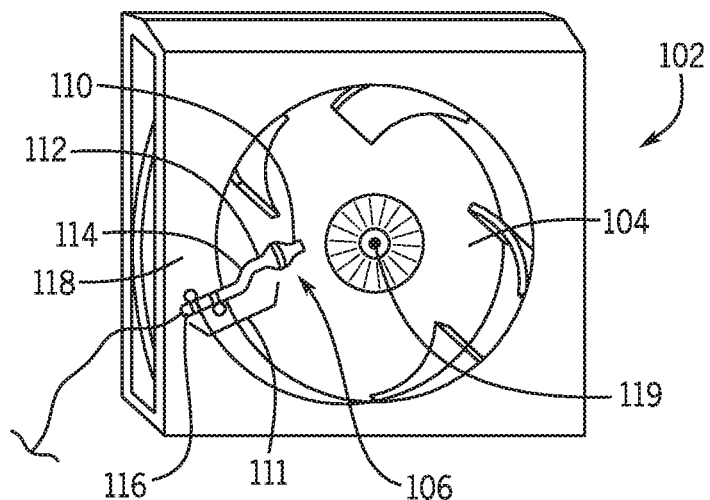
FIG. 6 is a perspective view of a fan for use in the fan grid assembly of FIG. 5, and having an adjustable thermal dispersion air flow rate meter, in accordance with embodiments described herein.

FIG. 6 is a perspective view of an embodiment of one of the fans 102 for use in the fan grid assembly of FIG. 5. The fan 102 includes the thermal dispersion air flow rate meter 106 mounted to a mounting surface 118 of the fan 102. The mounting surface 118 includes the air intake opening 104, as previously described, which enables air to be drawn into the fan 102.

The thermal dispersion air flow rate meter 106 includes a probe housing 110 in which one or more probes is disposed. The probe housing 110 may include a base resin material, such as a thermoplastic polymer, suitable for injection molding and other manufacturing processes. The thermal dispersion air flow rate meter 106 also includes an arm 111 having a probe-end 112 on which the probe housing 110 is disposed, a mounting-end 116 mounted to the mounting surface 118 of the fan 102, and an angled segment 114 extending between the mounting-end 116 and the probe-end 112. The angled segment 114 extends at a first angle with respect to the mounting-end 116, and at a second angle with respect to the probe-end 112. The first and second angle may be substantially equal.

As shown, the angled segment 114 and the probe-end 112 of the arm 111 are disposed in, or adjacent to, the air intake opening 104. The mounting-end 116 of the arm 111 is adjustably coupled to the mounting surface 118 of the fan 102. For example, the arm 111 and probe housing 110 may be rotated up to 360 degrees about a longitudinal mounting-end axis, which changes a position of the probe housing 110 adjacent the air intake opening 104. Indeed, the rotation about the longitudinal mounting-end axis causes movement of the probe housing 110 toward and away from the air intake opening 104, in some embodiments causing the probe housing 110 to be disposed inside the air intake opening 104. The rotation about the longitudinal mounting-end axis also causes changes to the radial position of the probe housing 110 with respect to a center 119 of the air intake opening 104. The mounting-end may also be translated, or "slid," along the mounting surface 118 of the fan 102, which also causes a change to the radial position of the probe housing 110 with respect to the center 119 of the air intake opening 104. These adjustability features enable positioning and repositioning of a location of the probe housing 110 with respect to a fluid flow through the air intake opening 104. In some embodiments, multiple thermal dispersion air flow rate meters 106 may be utilized and strategically positioned to sample air flow rates across various portions of the air intake opening 104. It should be noted that, in some embodiments, the angled segment 114 of the arm 111 may rest against the mounting surface 118, such that the arm 111 can only be rotated approximately 180 degrees about the longitudinal mounting-end axis.

Further to the points above, the probe housing 110 may be rotated with respect to a longitudinal probe-end axis. For example, the probe housing 110, as will be appreciated in view of later drawings, may include a pass-through opening in which sensing elements of the thermal dispersion air flow rate meter 106 are disposed. The probe housing 110 is rotatable about the longitudinal probe-end axis such that the pass-through opening is ideally positioned for receipt, and not blockage, of the fluid flow into the air intake opening 104. The sensing elements of the thermal dispersion air flow rate meter 106 may be encapsulated by a polyamide film forming a part of a "flex circuit" of the thermal dispersion air flow rate meter 106. Thus, when the probe housing 110 is rotated to facilitate ideal positioning of the pass-through opening with respect to a direction of the fluid flow over the probe housing 110, the fluid flow passes over a width of the flex circuit to pass over the sensing elements encapsulated therein.

Figure 7:
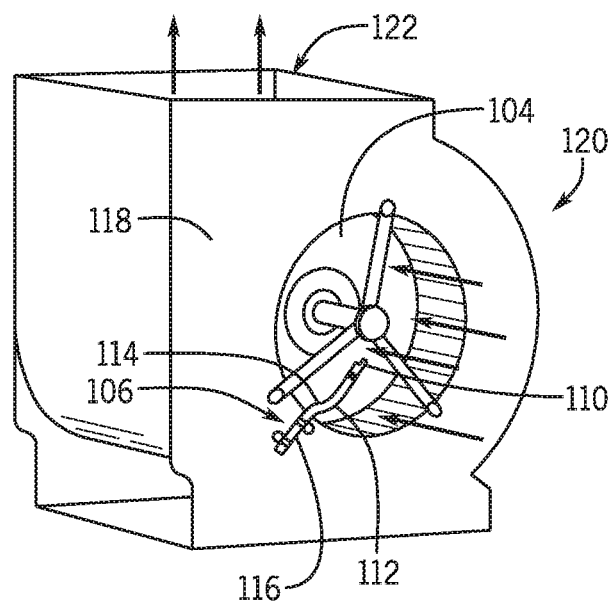
FIG. 7 is a perspective view of a fan having an adjustable thermal dispersion air flow rate meter, in accordance with embodiments described herein.

FIG. 7 is a perspective view of an embodiment of a different type of centrifugal fan 120 than the fan 102 in FIG. 6, having the adjustable thermal dispersion air flow rate meter 106 mounted thereon. The illustrated fan 120 may be utilized in an embodiment having only one fan, as opposed to the fan grid assembly illustrated in FIG. 5. For example, the thermal dispersion air flow rate meter 106 may be positioned to sample fluid flow, such as air flow, through the air intake opening 104, and the fluid flow may pass from the air intake opening 104, through the impeller, and toward an air outlet 122 of the fan 120. The thermal dispersion air flow rate meter 106 in FIG. 7 may be the same as the thermal dispersion air flow rate meter 106 in FIG. 6.

Figure 8:
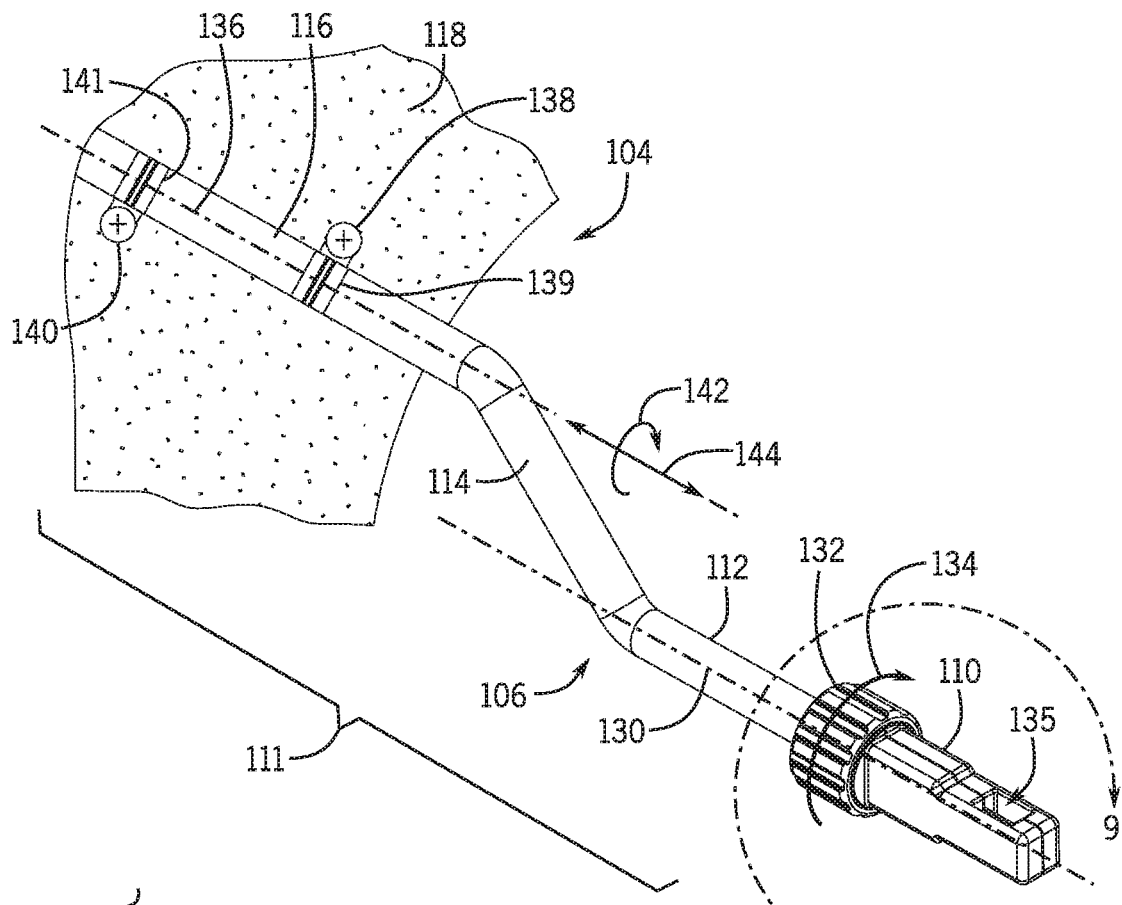
FIG. 8 is a perspective view of an adjustable thermal dispersion air flow rate meter, in accordance with embodiments described herein.

FIG. 8 is a perspective view of an embodiment of the adjustable thermal dispersion air flow rate meter 106 mounted to the mounting surface 118 of, for example, a fan having the air intake opening 104. The thermal dispersion air flow rate meter 106 includes the arm 111 having the probe-end 112, the angled segment 114, and the mounting-end 116. The mounting-end 116 of the arm 111 is adjustably coupled to the mounting surface 118 via a first screw 138 and a first clamp 139, and a second screw 140 and a second clamp 141. The clamps 139, 141 may couple to the mounting surface 118 at the non-screw end of the clamps 139, 141. Tightening of the first and second screws 138, 140 may tighten the corresponding first and second clamps 139, 141 over the mounting-end 116 of the arm 111. By temporarily loosening the screws 138, 140 and corresponding clamps 139, 141, the mounting-end 116 may be rotated within the clamps 139, 141 and about a longitudinal mounting-end axis 136. Rotation of the mounting-end 116 causes the angled segment 114, the probe-end 112, and the probe housing 110 (and features disposed therein) about the longitudinal mounting-end axis 136. The mounting-end 116 may also be translated, or "slid," within the clamps 139, 141 along arrow/direction 144.

After rotating and/or translating the mounting-end 116 of the arm 111 of the thermal dispersion air flow rate meter 106, the screws 138, 140 and corresponding clamps 139, 141 may be tightened to secure the thermal dispersion air flow rate meter 106 against air flow and other forces. As noted above, the rotation and translation functionality of the mounting-end 116 of the arm 111 facilitates repositioning of the probe housing 110 with respect to the air intake opening 104.

Figure 9:
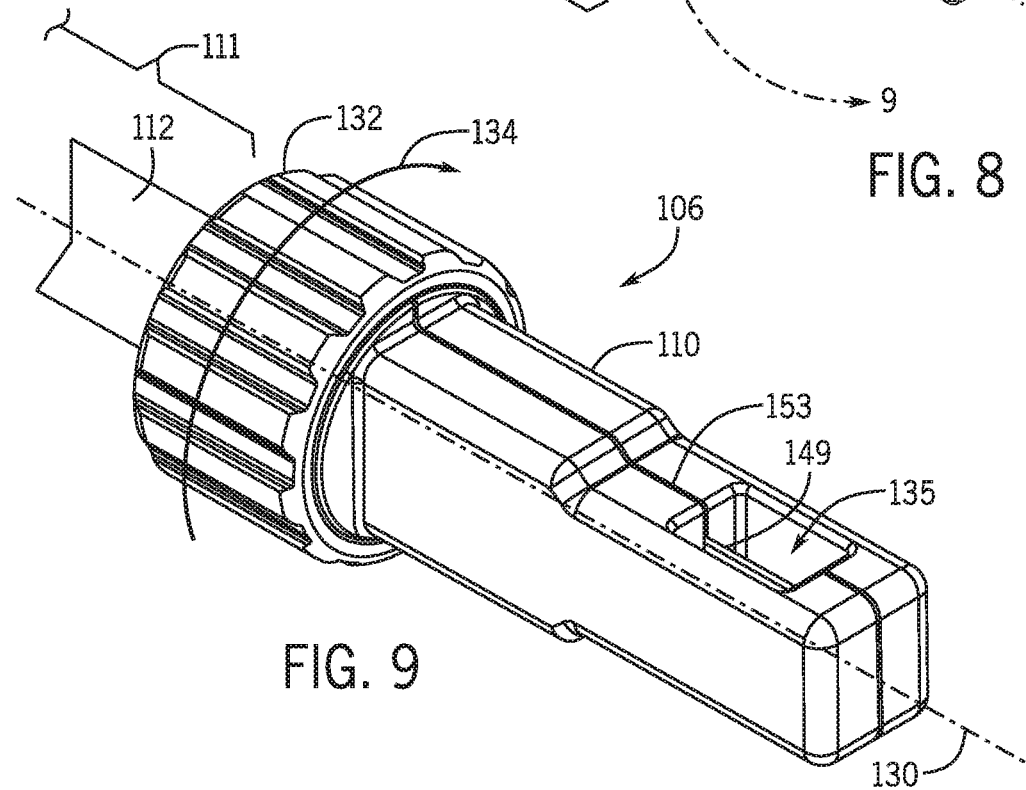
FIG. 9 is a perspective view of a portion of the adjustable thermal dispersion air flow rate meter of FIG. 8 taken along line 9-9 in FIG. 8, including a probe housing, in accordance with embodiments described herein.

Further to the points above, the thermal dispersion air flow rate meter 106 also includes the probe housing 110 rotatably coupled to the probe-end 112 of the arm 111. For example, a nut 132, such as a quarter-turn nut, may couple the probe housing 110 and the probe-end 112 of the arm 111. The probe housing 110 may be rotatable with respect to the probe-end 112 and about a longitudinal probe-end axis 130, via the nut 132 and corresponding engagement features. Thus, a pass-through opening 135, which extends transversely to the longitudinal probe-end axis 130 through an entirety of the probe housing 110 and is open-ended, may be repositioned. For example, the probe housing 110 may be turned such that the pass-through opening 135 plane is perpendicular to the air flow over the probe housing 110. Accordingly, the pass-through opening 135 receives the fluid flow without the probe housing 110 blocking the fluid flow through the pass-through opening 135. As will be appreciated in view of later drawings, sensing elements of the thermal dispersion air flow rate meter 106 may extend within the pass-through opening 135, such that the fluid flow passes over the sensing elements. FIG. 9 is a perspective view a portion of the adjustable thermal dispersion air flow rate meter 106 of FIG. 8 taken along line 9-9 in FIG. 8, which includes an enlarged detail view of the probe housing 110 and a portion of the probe-end 112 of the arm 111. A polyamide film 149, extending along a centerline 153 of the probe housing 110, may include the sensing elements disposed therein, forming a portion of a "flex circuit," which may be described as a sensor or sensing circuit. A portion of the polyamide film 149 is partially visible, in the illustrated embodiment, within the pass-through opening 135 of the probe housing 110. The polyamide film 149 and corresponding sensing elements of the flex circuit will be described in detail with reference to alter drawings.

Figure 10:
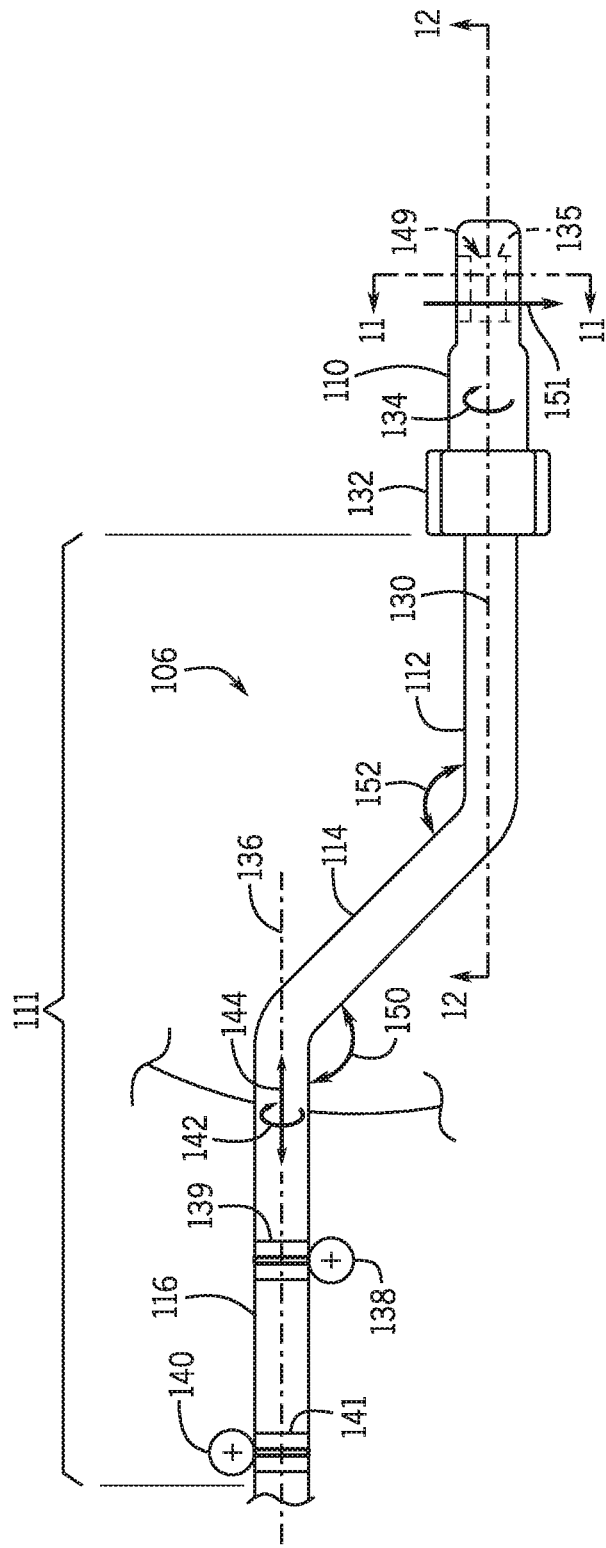
FIG. 10 is a side view of the adjustable thermal dispersion air flow rate meter of FIG. 8, in accordance with embodiments described herein.

FIG. 10 is a side view of the adjustable thermal dispersion air flow rate meter 106 of FIG. 8. As shown, the angled segment 114 extends from the mounting-end 116 of the arm 111 at a first angle 150, and from the probe-end 112 of the arm 111 at a second angle 152. The first angle may be substantially equal to the second angle 152. As previously described, the angled segment 114 enables adjustability of a position of the probe housing 110 and corresponding elements with respect to, for example, an air intake opening of a fan. As shown, the pass-through opening 135 of the probe housing 110 extends entirely through the probe housing 110, such that an air flow 151 may pass through the pass-through opening 135. The polyamide film 149 extends within the pass-through opening 135, and includes sensing elements therein as described in detail below with reference to FIGS. 11 and 12.

Figure 11:
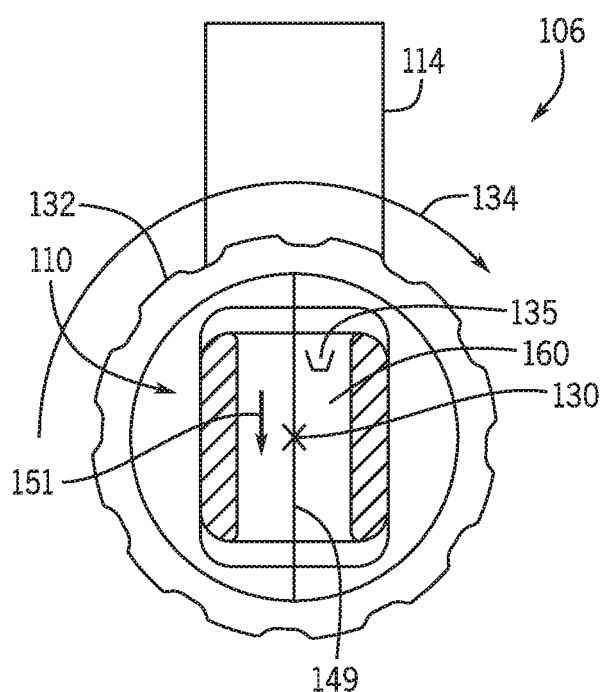
FIG. 11 is a cross-sectional front view of a portion of the adjustable thermal dispersion air flow rate meter taken along line 11-11 in FIG. 10, in accordance with embodiments described herein.

FIG. 11 is a cross-sectional front view of portion of the adjustable thermal dispersion air flow rate meter 106 taken along line 11-11 in FIG. 10. As previously described, the nut 132 and/or additional engagement features of the nut assembly, may enable rotation of the probe housing 110 about the longitudinal probe-end axis 130, such that the pass-through opening 135 is oriented to receive an air flow. For example, the pass-through opening 135 may be oriented such that the polyamide film 149 extends parallel to the expected air flow 151. The polyamide film 149 may extend through opposing walls partially forming the pass-through opening 135 of the probe housing 110, to secure the polyamide film 149 against air flow and other forces. While one of the opposing walls is not illustrated due to the cross-section, one of the opposing walls 160 is shown. The sensing elements are also omitted from the illustrated embodiment in FIG. 11, but are illustrated in FIG. 12 described below.

Figure 12:
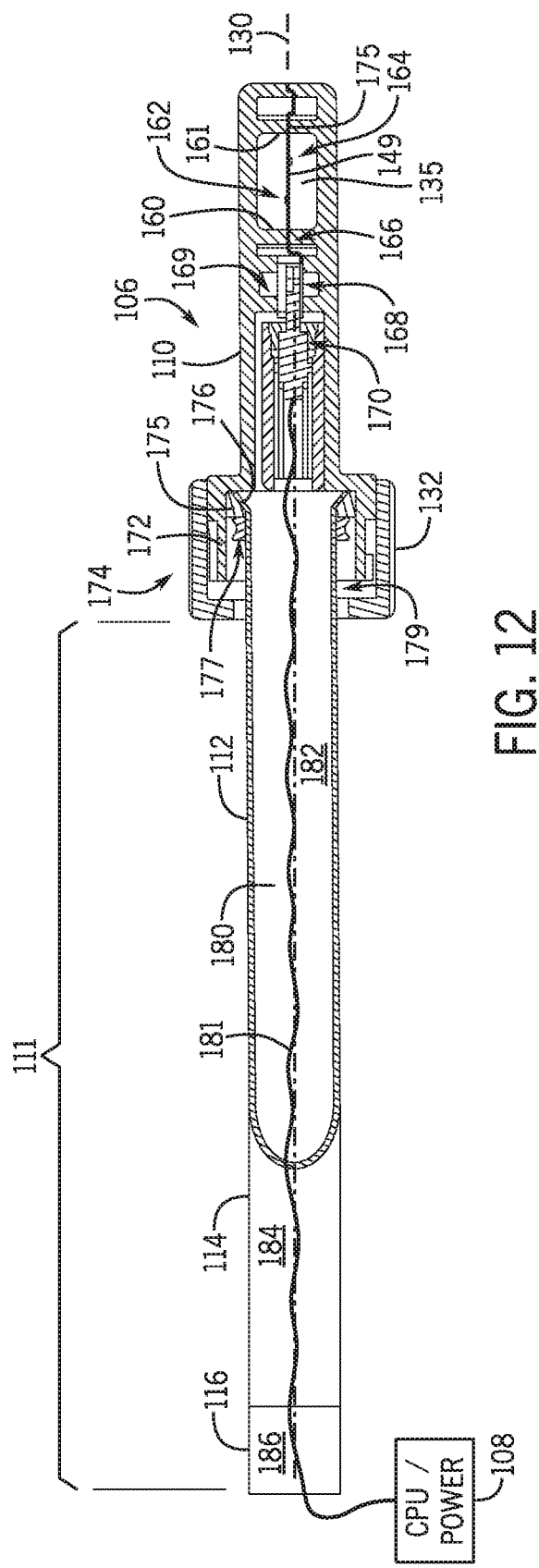
FIG. 12 is a cross-sectional side view of a portion of the adjustable thermal dispersion air flow rate meter taken along line 12-12 in FIG. 10, in accordance with embodiments described herein.

FIG. 12 is a cross-sectional side view of a portion of the adjustable thermal dispersion air flow rate meter 106 taken along line 12-12 in FIG. 10. As previously described, the probe housing 110 includes a pass-through opening 135 which extends entirely through the probe housing 110, such that an air flow is enabled therethrough. The polyamide film 149 of the flex circuit also extends within and through the pass-through opening 135. The polyamide film 149 extends through, and is secured by, the opposing side walls 160, 161 partially forming the pass-through opening 135.

As noted throughout the disclosure above, the thermal dispersion air flow rate meter 106 includes an active heated element 162 and an unheated element 164. Electrical wattage, or a "heating current," is provided to the activated heated element 162. For example, electrical wires may extend from the active heated element 162 and the unheated element 164 through the polyamide film 149, which extends through the side wall 160, for example through a sealed opening 166 in the side wall 160. A receptacle 169 is disposed on an opposing side of the side wall 160 from the pass-through opening 135. The polyamide film 149 and electrical wires terminate at a micro-USB port 168 disposed in the receptacle 169. Thus, in certain embodiments, the receptacle 169 may be referred to as a "micro-USB receptacle." The micro-USB port 168 is accessible by a micro-USB 170, as shown.

As previously described, the thermal dispersion air flow rate meter 106 may include a "constant current" embodiment, or a "constant temperature differential" embodiment. In the "constant current" embodiment, the electrical wattage provided to the activated heated element 162 may be substantially constant. A temperature differential between and the active heated element 162 and the ambient unheated element 164 (which corresponds to the cooling effect of the air flow passing over the ambient unheated element 164) may be measured. In other words, the temperature differential, which may change during operation of the thermal dispersion air flow rate meter 106, is the output from the sensing elements. Air flow rate is then determined as a function of the temperature differential between the active heated element 162 and the ambient unheated element 164. For example, the internal resistance of the sensing elements is deducible from the measured temperature differential and the constant heating current, power consumption is deducible from the internal resistance, and air flow rate is deducible from the power consumption.

In another embodiment, referred to herein as the "constant temperature differential" embodiment, the heating current to the active heated element 162 is modulated or adjusted to maintain a constant temperature differential between the activated heated element 162 and the unheated element 164. Since the heating current is proportional to the cooling effect of the molecules of air flow flowing over the probe housing 110, the air flow rate is deducible via analysis of the electrical wattage provided to the activated heated element 162. For example, as the fluid flow passes over the active heated element 162, molecules of the fluid may extract heat from the active heated element 162. Thus, the electrical wattage provided to the active heated element may be increased such that the temperature differential between the active heated element 162 and the ambient unheated element 164 is maintained. The heating current, or change to the heating current, required to maintain the constant temperature differential is correlated with, or proportional to, the cooling effect caused by the molecules flowing by the probe. Thus, the air flow rate is deducible from the cooling effect caused by the molecules and, thus, from the heating current (or corresponding electrical power) provided to the active heated element 162, by way of the correlation/proportionality noted above As previously described, a nut assembly 174 coupling the arm 111 of the thermal dispersion air flow rate meter 106 to the probe housing 110 of the thermal dispersion air flow rate meter 106 may include the nut 132. The nut 132 may be a quarter-turn nut which, in an engagement position, compresses an O-ring 175 and an X-profile O-ring 177 of the nut assembly 174 in a space between an extension 172 of the probe housing 110 and a flange 176 of the arm 111, which engages the arm 111 and the probe housing 110. That is, a compression sleeve (not shown) may be disposed in a space 179 between the arm 111 and the nut assembly 174, and tightening of the nut 132 may cause axial compression of the compression sleeve, the X-profile O-ring 177, and the O-ring 175 along the probe-end axis 130. When the nut 132 is in a loosened position such that the compression sleeve, the X-profile O-ring 177, and the gasket 175 are not in a compressed condition, the probe housing 110 is rotatable 360 degrees about the longitudinal probe-end axis 130, such that the pass-through opening 135 can be oriented with respect to the expected air flow. After the probe housing 110 is adequately positioned, the quarter-turn nut 132 may be turned into the engagement position, when compresses the gasket 175 as noted above.

Further to the points above, the probe housing 110 is removable from the arm 111 by fully disengaging the nut 132, referred to as a disengaged position. Thus, portions of the micro-USB port 168, the micro-USB 170, the polyamide film 149, the active heated element 162, the unheated element 164, and other features of the thermal dispersion air flow rate meter 106 disposed at, in, or adjacent to the probe housing 110 are replaceable and/or serviceable. Further, the removability of the probe housing 110 enables calibration of the sensing elements and micro-USB connection described above. For example, after removing the probe housing 110 from the arm 111, the components are accessible for resistance testing.

Further, the arm 111 may be a hollow conduit, namely, by forming a cavity 180 therethrough. For example, the probe-end 112 of the arm 111 may include a hollow portion 182, the angled segment 114 may include a hollow portion 184, and the mounting-end 116 may include a hollow portion 186, where the hollow portions 182, 184, 186 form a continuous cavity 180. The cavity 180 may be configured to receive an electrical cable 181 which couples to, and extends from, the micro-USB 170. The electrical cable 181 may couple to a CPU/power source 108, as previously described with respect to FIG. 5.

In accordance with the present disclosure, the adjustable thermal dispersion air flow rate meter can be turned and/or translated about several locations to reposition the probe housing and other portions of the thermal dispersion air flow rate meter. The adjustability features enable improved accuracy of air flow rate and temperature measurements. The probe housing is also removable from the arm of the thermal dispersion air flow rate meter, which enables servicing, replacement, resistance testing, and calibration via the resistance testing, of certain parts located at or in the probe housing. Further, the thermal dispersion air flow rate meter includes a micro-USB connection between a Central Processing Unit (CPU), which may include a power source, and the sensing elements, which facilitates improved accuracy and, in some embodiments and/or conditions, may reduce power consumption over traditional embodiments having welded or soldered connections. Further still, the sensing or flex circuit described above, which utilizes a polyamide film encapsulating the sensing elements and corresponding electrical wires, may reduce or negate a susceptibility to thermal shock over traditional thermistor embodiments which utilize glass-beaded sensing elements.

While only certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An air flow rate meter, comprising:
   a probe housing comprising a pass-through opening;
   a sensing circuit coupled with the probe housing and positioned at least partially within the pass-through opening; and
   an arm coupled to the probe housing, wherein the arm comprises a probe-end on which the probe housing is disposed, a mounting-end opposite to the probe-end, and an angled segment extending at a first angle from the probe-end and at a second angle from the mounting-end.

2. The air flow rate meter of claim 1, wherein the sensing circuit comprises a thermal dispersion air flow rate sensing circuit.

3. The air flow rate meter of claim 1, wherein the probe housing is rotatably coupled to the probe-end of the arm such that the probe housing is rotatable about a longitudinal axis extending through the probe-end.

4. The air flow rate meter of claim 3, comprising a nut assembly coupling the probe housing and the probe-end of the arm, wherein the nut assembly comprises a quarter-turn nut which couples the probe-end and the probe housing by compressing a gasket therebetween.

5. The air flow rate meter of claim 1, wherein the sensing circuit comprises a flex circuit, and the flex circuit comprises a polyamide film encapsulating an ambient element and an active heated element of the air flow rate meter.

6. The air flow rate meter of claim 1, wherein the arm is rotatable about a longitudinal axis of the mounting-end.

7. The air flow rate meter of claim 1, comprising a screw assembly and an additional screw assembly, wherein the screw assembly comprises a screw and a clamp configured to couple the mounting-end of the arm to a substrate surface, and wherein the additional screw assembly comprises an additional screw and an additional clamp configured to couple the mounting-end of the arm to the substrate surface.

8. The air flow rate meter of claim 1, wherein the probe housing comprises a receptacle in which a micro-USB port is disposed, wherein the receptacle is accessible by a micro-USB, and wherein the micro-USB is coupled to an electrical cable extending through the a cavity in the arm.

9. The air flow rate meter of claim 8, wherein the sensing circuit comprises a flex circuit coupled to, and extending from, the micro-USB port, wherein the flex circuit comprises an active heated element of the air flow rate meter and an ambient element of the air flow rate meter.

10. The air flow rate meter of claim 9, comprising a micro-USB coupled to the micro-USB port and configured to provide a heating current to the active heated element.

11. The air flow rate meter of claim 1, wherein the sensing circuit comprises an active heated element and an ambient element, wherein the air flow rate meter is configured to convey a constant heating current to the active heated element, and wherein the air flow rate meter is configured to determine a temperature differential between the active heated element and the ambient element.

12. The air flow rate meter of claim 1, wherein the sensing circuit comprises an active heated element and an ambient element, wherein the air flow rate meter is configured to modulate a heating current to the active heated element in order to maintain a constant temperature differential between the active heated element and the ambient element.

13. A fan, comprising:
   a mounting wall; and
   an air flow rate meter, wherein the air flow rate meter comprises a hollow arm having a mounting-end adjustably coupled to the mounting wall of the fan, having a probe-end on which a probe housing of the air flow rate meter is disposed, and having an angled segment extending at a first angle from the mounting-end and at a second angle from the probe-end;
   wherein the hollow arm is rotatable about a longitudinal mounting-end axis of the hollow arm, wherein the probe housing is rotatable about a longitudinal probe-end axis of the hollow arm, or both.

14. The fan of claim 13, wherein the mounting wall defines an air intake opening to the fan, and wherein the air flow rate meter is coupled to the mounting wall such that the probe housing on the probe-end of the hollow arm is configured to receive an air flow into the air intake opening.

15. The fan of claim 14, wherein the probe housing comprises a pass-through opening configured to enable the air flow to pass through the pass-through opening, wherein the air flow rate meter comprises a flex circuit extending across the pass-through opening.

16. The fan of claim 15, wherein the air flow rate meter is a thermal dispersion air flow rate meter, and wherein the thermal dispersion air flow rate meter comprises:
   an active heated element disposed in the flex circuit and positioned in the pass-through opening; and
   an ambient element disposed in the flex circuit and positioned in the pass-through opening.

17. The fan of claim 16, wherein the probe housing comprises a receptacle adjacent to the pass-through opening and enclosed from the pass-through opening, wherein the thermal dispersion air flow rate meter comprises a micro-USB port disposed in the receptacle, and wherein the flex circuit terminates at the micro-USB port.

18. The fan of claim 17, comprising a micro-USB coupled to the micro-USB port and configured to provide a heating current to the active heated element.

19. The fan of claim 16, wherein the flex circuit comprises a polyamide film in the active heated element, the ambient element, and corresponding electrical wires are disposed.

20. A thermal dispersion air flow rate meter, comprising:
a probe housing having a micro-USB receptacle enclosed from a fluid flow over the probe housing;
a micro-USB port disposed in the micro-USB receptacle; and
a flex circuit extending from the micro-USB port within the micro-USB receptacle and into a pass-through opening formed by the probe housing, wherein the flex circuit comprises an ambient reference element and an active heated element positioned on the flex circuit within the pass-through opening formed by the probe housing.

21. The thermal dispersion air flow rate meter of claim 20, comprising a micro-USB coupled to the micro-USB port and configured to provide a heating current to the active heated element in order to maintain a constant temperature differential between the active heated element and the ambient reference element.

22. The thermal dispersion air flow rate meter of claim 20, comprising an arm rotatably coupled to the probe housing such that the probe housing is rotatable about a longitudinal axis of the arm.

23. The thermal dispersion air flow rate meter of claim 20, comprising an arm having a probe-end, an angled segment extending at a first angle from the probe-end, and a mounting-end extending at a second angle from the angled segment.

24. The thermal dispersion air flow rate meter of claim 23, wherein the probe-end, the angled segment, and the mounting-end form a hollow conduit.

25. The thermal dispersion air flow rate meter of claim 24, comprising:
a micro-USB coupled to the micro-USB port; and
a cable extending from the micro-USB and within the hollow conduit formed by the probe-end, the angled segment, and the mounting-end of the arm.

* * * * *